United States Patent
Rödbro et al.

(10) Patent No.: US 8,868,003 B2
(45) Date of Patent: Oct. 21, 2014

(54) CONTROLLING TRANSMISSION OF DATA

(75) Inventors: Christoffer Rödbro, Stockholm (SE); Mingyu Chen, Stockholm (SE); Sören Vang Andersen, Esch-sur-Alzette (LU)

(73) Assignee: Skype, Dublin (IE)

( * ) Notice: Subject to any disclaimer, the term of this patent is extended or adjusted under 35 U.S.C. 154(b) by 157 days.

(21) Appl. No.: 13/341,287

(22) Filed: Dec. 30, 2011

(65) Prior Publication Data

US 2013/0095764 A1   Apr. 18, 2013

(30) Foreign Application Priority Data

Oct. 17, 2011   (GB) .................................. 1117867.0

(51) Int. Cl.
| | |
|---|---|
| *H04B 17/00* | (2006.01) |
| *H04L 12/825* | (2013.01) |
| *H04W 28/10* | (2009.01) |
| *H04L 12/801* | (2013.01) |
| *H04L 12/835* | (2013.01) |

(52) U.S. Cl.
CPC .................. *H04L 47/18* (2013.01); *H04L 47/30* (2013.01); *H04L 47/25* (2013.01); *H04W 28/10* (2013.01)
USPC ........ 455/67.11; 370/232; 370/312; 370/235; 370/329; 709/219; 709/224

(58) Field of Classification Search
CPC ......... H04L 47/25; H04L 47/18; H04L 47/30; H04W 28/10
USPC .......... 455/67.11, 445, 41.2, 450, 452.2, 453, 455/509; 709/219, 224; 370/232, 312, 328, 370/329, 417
See application file for complete search history.

(56) References Cited

U.S. PATENT DOCUMENTS

| | | | | |
|---|---|---|---|---|
| 6,961,334 B1 * | 11/2005 | Kaczmarczyk | ................ | 370/354 |
| 7,688,788 B2 * | 3/2010 | Gefflaut et al. | ................ | 370/332 |
| 7,830,920 B2 * | 11/2010 | Cole | ............................. | 370/477 |
| 8,259,570 B2 * | 9/2012 | Rodbro et al. | ................ | 370/230 |
| 8,300,542 B2 * | 10/2012 | Peisa et al. | ..................... | 370/252 |
| 8,320,385 B1 * | 11/2012 | Bali et al. | ................... | 370/395.4 |

(Continued)

FOREIGN PATENT DOCUMENTS

| | | |
|---|---|---|
| EP | 1981212 | 10/2008 |
| GB | 2466208 | 6/2010 |
| WO | WO-2007044179 | 4/2007 |
| WO | WO-2008064324 | 5/2008 |

OTHER PUBLICATIONS

"International Search Report and Written Opinion", Application No. PCT/US2012/060691, (Feb. 8, 2013), 11 pages.

(Continued)

*Primary Examiner* — Marceau Milord
(74) *Attorney, Agent, or Firm* — Sonia Cooper; Jim Ross; Micky Minhas

(57) ABSTRACT

In an embodiment, a method of controlling transmission of data from a wireless device to a receiver connected via a communication channel includes an application executing on the wireless device providing an estimate of end-to-end bandwidth of the communication channel; supplying to the application from wireless access circuitry in the wireless device at least on communication-related parameter and modifying in the application the estimate of end-to-end bandwidth using the at least one communication-related parameter.

24 Claims, 4 Drawing Sheets

(56) References Cited

U.S. PATENT DOCUMENTS

| | | | |
|---|---|---|---|
| 8,358,580 B2 * | 1/2013 | Ray et al. | 370/230 |
| 8,520,603 B2 * | 8/2013 | Kozisek et al. | 370/328 |
| 8,531,954 B2 * | 9/2013 | McNaughton et al. | 370/235 |
| 8,537,695 B2 * | 9/2013 | Wiley et al. | 370/252 |
| 2006/0133276 A1 | 6/2006 | Cole | |
| 2008/0125133 A1 * | 5/2008 | Chmaytelli | 455/450 |
| 2009/0103450 A1 | 4/2009 | Pelsa et al. | |
| 2012/0083264 A1 * | 4/2012 | Ramasamy et al. | 455/425 |
| 2013/0135995 A1 * | 5/2013 | Wu et al. | 370/229 |

OTHER PUBLICATIONS

"Search Report", GB Application No. 1117867.0, (Feb. 15, 2013), 7 pages.

* cited by examiner

CONTROLLING TRANSMISSION OF DATA

RELATED APPLICATION

This application claims priority under 35 U.S.C. §119 or 365 to Great Britain Application No. GB 1117867.0, filed Oct. 17, 2011. The entire teachings of the above application are incorporated herein by reference.

TECHNICAL FIELD

The present invention relates to controlling transmission of data from a wireless device to a receiver.

BACKGROUND

FIG. 1 is a schematic block diagram of a communication system comprising a first user terminal UE1 and a second user terminal UE2. The first and second user terminals are in communication over a communication network 2. In order for communications to be provided between the first and second user terminals, a communication channel is set up between them. This channel comprises a first leg between the user terminal and the network, a leg across the network itself, and a leg between the network and the second user terminal. Each leg can be wired or wireless—wireless connections are shown by way of example. The communication network can be packet switched, that is data to be transmitted from the first user terminal to the second user terminal takes the form of packets to be conveyed over the communication channel set up between them. In an attempt to try and improve data flow, minimize congestion and for efficiency's sake, rate control is widely used in such transmissions. That is, the rate at which data is transmitted from the sending side (transmitter) is controlled based on information relating to the available bandwidth over which it is to be transmitted. One approach to rate control is end-to-end rate control. End-to-end rate control can be implemented in a number of different forms, but in principle, relies on information about the channel which exists from end-to-end between the sending side (transmitters) and the receiving side (receiver). In any implementation of end-to-end rate control, a message from the transmitter has to reach the receiver, and information relating to the message (or the message itself) returned from the receiver to the transmitter in a round trip. End-to-end rate control has the advantage that no assumptions are made as to where the smallest bottleneck on the communication channel sits. On the other hand, as congestion starts building up at the bottleneck, this has to be detected at the receiver and a message returned to the sender. Thus, reacting to congestion takes at least a round-trip time (RTT), during which the congestion becomes worse, potentially harming a real time communication experience.

SUMMARY

It is an aim of the present invention to provide a technique for controlling transmission of data which retains the end-to-end rate control advantages, but which improves reaction times.

According to an aspect of the present invention there is provided a method of controlling transmission of data from a wireless device to a receiver connected via a communication channel, the method comprising:

an application executing on the wireless device providing an estimate of end-to-end bandwidth of the communication channel;

supplying to the application from wireless access circuitry in the wireless device at least on communication-related parameter;

modifying in the application the estimate of end-to-end bandwidth using the at least one communication-related parameter.

A computer program product comprising code embodied on a non-transient computer-readable medium which when executed implement the above-defined method is also provided.

The term "end-to-end bandwidth" used herein is not intended to be restricted to a situation where the bandwidth is estimated between a source and a final destination. In the present context, end-to-end bandwidth relates to the situation where so called intelligent operations occur at the end points of a communication system, in contrast with a model of intelligent operations being carried out in the communication network itself. The end-to-end principle is one of the central design principles of the current internet, and applies to many other network communication systems. A benefit of the end-to-end principle is that the network does not have to maintain the state of each traffic flow through it, and so network design becomes more simple and robust.

In particular, end-to-end bandwidth can encompass end points which include sender, receiver or overlay/relay nodes which may be situated between the sender and an ultimate receiver.

Another aspect of the invention provides a processor for use in a wireless device for transmitting data over a wireless channel to a receiver, a computer program product comprising program code means which when executed on a processor configure an application to carry out the following steps: providing estimate of end-to-end bandwidth of a communication channel; receive at least one communication related parameter from wireless access circuitry; and modify the estimate of end-to-end bandwidth using the at least one communication related parameter.

The following described embodiments of the present invention combine the advantages of end-to-end rate control with local monitoring at the wireless access level. That is, the local queue assisted rate control described herein allows end points to do the rate control instead of requiring the network to make decisions. The inventors have appreciated that in many cases, the wireless access technology, and particularly the uplink, is the weakest link on a communication channel and thus the most likely source of congestion. By monitoring communication-related parameters at the wireless access level, in particular buffer status indicators, and notifying the application layer, the advantages of end-to-end rate control can be combined with a fast reaction based on information at the wireless access level. Thus, in the following described embodiments, it is possible to react immediately to changes in the local buffer, while maintaining end-to-end rate control should the bottleneck in fact sit elsewhere than in the local wireless uplink.

End-to-end bandwidth estimation can be then at the sender side or the receiver side. That is, the application can be considered to generate the estimate of end-to-end bandwidth at the wireless device (on the send side), for example based on feedback from a remote device such as the sender, perhaps in the form of measuring and low pass filtering the rate of return acknowledgements from the remote device or receiver.

Alternatively, the estimate of end-to-end bandwidth can be carried out on the receive side, and the application can be configured to receive an estimate of end-to-end bandwidth from a remote device or the receiver.

Thus, it is possible to monitor a local buffer provided at the wireless access circuitry constantly, and to immediately react to congestion by notifying the application as soon as congestion is detected. Because the feedback from the wireless access level can be direct measurements of the buffer queue status at that level, they are much more reliable than queuing estimates underlying end-to-end delay-based rate control, because the latter can be contaminated by clock-offset problems and network artifacts, such as a Wifi beacon search.

For a better understanding of the present invention to show how the same may be carried into effect, reference will now be made to the following drawings.

DETAILED DESCRIPTION

In the following described embodiments of the invention, in a wireless packet switch communication system (GPRS, UMTS, HSDPA, Wimax, LTE, Wifi etc) the sending side constantly monitors the amount of traffic awaiting transmission in a physical (network) layer. Information pertaining to this buffered data at the physical layer is fed to an application layer to facilitate improved rate control. Specifically, in one embodiment, it is shown how to combine such information with end-to-end rate control to achieve a more agile rate controller.

Figure 1:
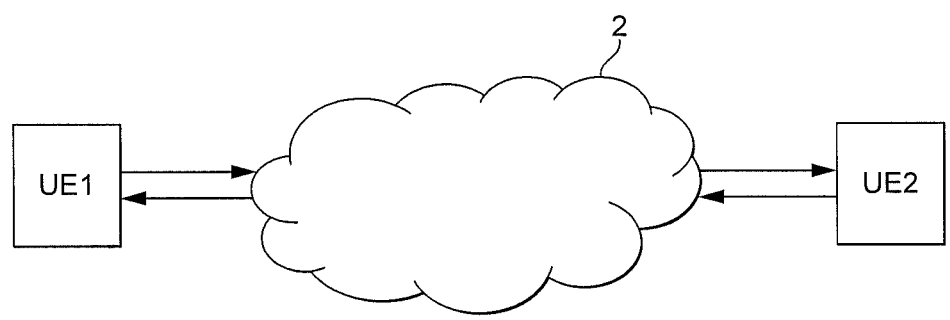
FIG. 1 is a schematic block diagram of a communication system.
Figure 2:
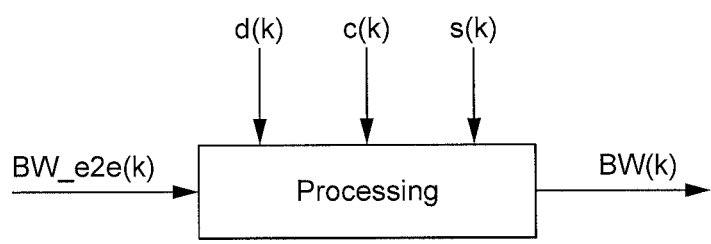
FIG. 2 is a schematic block diagram of the principles of the present invention.

FIG. 2 is a schematic block diagram illustrating the principles underlying the present invention. A bandwidth modification function implemented by processing code at the application layer receives an estimate of bandwidth BW-e2e from an application executing in the application layer, typically from a rate control part of the application, and further receives communication-related parameters d(k), c(k) and s(k) from a lower protocol layer responsible for wireless access. The modification function provides a modified estimate of the bandwidth BW(k).

Figure 2A:
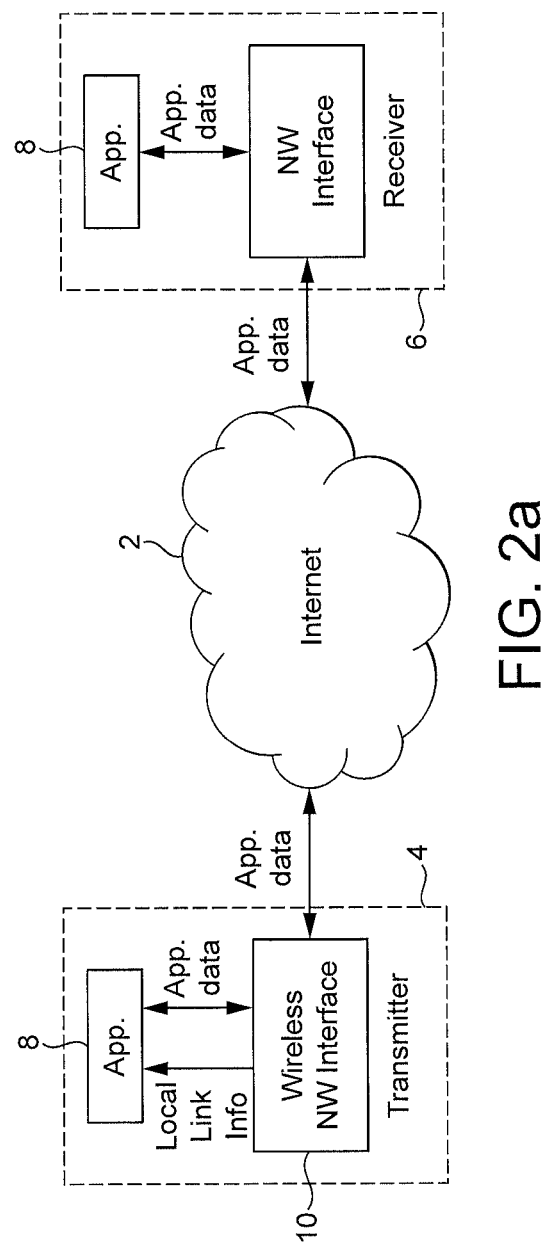
FIG. 2A is a schematic block diagram illustrating a transmitter and a receiver.

A schematic version of the context of the invention is described with reference to FIG. 2A. A transmitter 4 sends real time data (for example, audio and/or video) to a receiver 6 over a packet-based network such as the Internet 2. The transmitter 4 uses a wireless access technology such as UMTS, HSDPA, Wimax, LTE, Wifi etc. to access the Internet, whereas the receiver 6 can use any technology (wired or wireless).

The transmitter is a wireless device which includes a microprocessor 8 which executes programs in the form of code which can be held locally in the microprocessor 8 or in a memory connected to it. The wireless device 4 has a radio access chip 10 for transmitting and receiving radio frequency (RF) communications between the wireless device 4 and the network 2.

RF communications between the wireless device 4 and the network 2 take place by transmitting and receiving RF signals over radio channels by the radio access chip 10.

Figure 3:
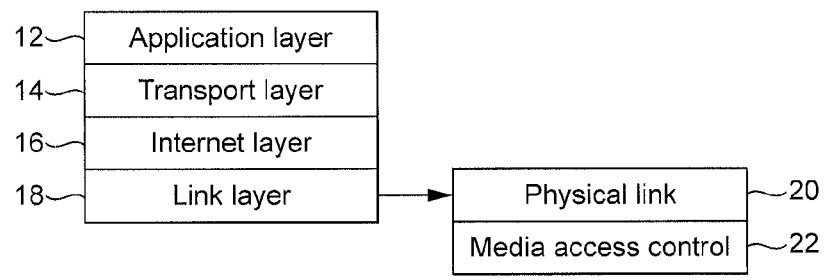
FIG. 3 is a schematic diagram showing layers in a wireless device.

The wireless device can be any piece of user equipment (UE) which supports at least one radio access technology, for example, GPRS, UMTS, HSDPA, Wimax, LTE or Wifi. Software for execution by the processor is organized in a protocol stack of the type illustrated in FIG. 3. FIG. 3 illustrates only one example of a stack—there are many variations currently in use and the invention can be applied in any type of stack. The stack exemplified in FIG. 3 includes an application layer 12, a transport layer 14, an Internet layer 16 and a link layer 18. The link layer is subdivided into a physical link layer 20 and a media access control (MAC) layer 22.

The link layer is responsible for organizing communication technologies for the device 4. The media access control layer 22 within the link layer 18 is responsible for addressing, assigning multiple channels to different users and avoiding collisions, amongst other things. In particular, it is responsible for controlling the operational mode of the radio. It contains a buffer for queuing data to be transmitted and monitoring circuitry, discussed more fully later. Each layer can communicate with its equivalent layer in a different wireless device—the link layer 18 communicates with a corresponding link layer in a different device at the level of RF data in the form of frames.

The Internet layer provides Internet communications in the form of packets carrying IP (Internet Protocol) data with IP headers, and is responsible for IP addressing.

The transport layer 14 runs host to host communications according to the transmission control protocol (TCP) or a user datagram protocol (UDP), for example. In this context, a host is any kind of user equipment seeking to communicate wirelessly.

The application layer 12 handles application-based interactions on a process-to-process level between communicating hosts. It is this layer that runs user applications which may generate data to be transmitted over the channel. Thus, embodiments of the invention are described in the context that a user equipment runs at least one application that connects to the Internet 2 through at least one of the radio access technologies through the media access control layer 22.

The invention can be used with a number of different applications, but one particular context concerns social communications, such as VoIP (Voice over Internet Protocol) calls between UE's, instant messaging (IM) chat or live meetings run over a conference framework. Alongside these kind of services, applications can be responsible for data transfer, such as file transfer, updating presence information for contacts in a social network, or control data such as "keep-alive" data.

Preferably, the application sending the real-time data over the Internet has an end-to-end rate control scheme implemented to determine the coding rates of the real-time data. This end-to-end scheme can be any method known in the art, such as described in Jacobson, V., Congestion Avoidance and Control, ACM Computer Communications Review, 18(4): 314-329, August 1988. Such schemes generally fall into two categories:

Receiver based, where the receiving side estimates the proper bandwidth to use over the end-2-end connection based on reception of the data.

Transmitter based, where the transmitting side decides on the bandwidth to use based on special feedback fed back from the receiver.

In either case, the estimate of end-to-end bandwidth provided by the application is referred to as BW_e2e. Information on which the end-to-end rate control is based must traverse the network from the receiver to the transmitter; thus it will be subject to delay. Thus, in case of congestion somewhere on the network path, the transmitter reaction to it will be delayed accordingly, and the congestion problems become worse.

In an alternative, but not preferred, embodiment the end-to-end estimate may simply equal the recent sending rate but such an approach can be problematic if the bottleneck sits elsewhere.

The inventors have appreciated that in many cases, the wireless access technology, and especially its uplink, is the weakest link on a communication path, and thus the most likely source of congestion. This congestion will manifest as a build-up of a packet queue in the same device or computer as is running the real-time application, however, at a different network layer. In the described embodiments of this invention, the lower network layers 20,22 continuously inform the application layer about the state of their internal buffer or other communication-related parameter monitored at the wireless level. This information may comprise one or more of the following parameters:

- The current buffer size in time ($d(k)$), bytes ($N(k)$), or similar. The two can be interchanged by the relation $N(k)=d(k)*R(k)$ with $R(k)$ being the recent sending rate, and thus we can write $d(k)$ in the following without loss of generality.
- A specialized congestion indication parameter, $c(k)$.
- Antenna signal-to-noise ratio (SNR) or similar, $s(k)$.
- An indication of traffic sent by other applications (cross-traffic), for example, $Xtr(k)=tr\_0(k)/tr\_tot(k)$, where $tr\_0$ is the applications own sending rate and $tr\_tot$ is the total sending rate of all applications.

where k is a counting index. This information may be fed at predetermined intervals, or preferably adaptively, so that urgent information like congestion is given to the application layer immediately when it occurs.

A time average of above-mentioned parameters can also be utilized.

An example implementation of $c(k)$ is to set $c(k)=1$ when $d(k)$ exceeds a pre-specified threshold, and back to 0 when it goes below another lower threshold.

The information fed from the lower network layers is used to modify the end-to-end bandwidth estimate. For example, we can use the parameters to find a correction term to the end-to-end bandwidth:

$$BW(k)=BW\_e2e(k)+f(p(k)) \quad (1)$$

Where $p(k)$ is the aggregation of present and past values of $d(k)$, $c(k)$ and $s(k)$.

In a preferred embodiment we use for $f(\ )$ $$f(p(k))=\min(beta*BW\_e2e(k), alpha(k)*BW\_e2e(k)*(d\_target-d\_aggr(k))) \quad (2)$$

Where d_target is a constant, alpha(k) is a stepsize factor and d_aggr is an aggregated delay value, calculated from the generalized parameter set p(k) of current and past values. Limiting $f(p(k))$ is necessary should the bottleneck sit elsewhere in the network; suggested value is in range beta=0.0-0.05.

Figure 4:
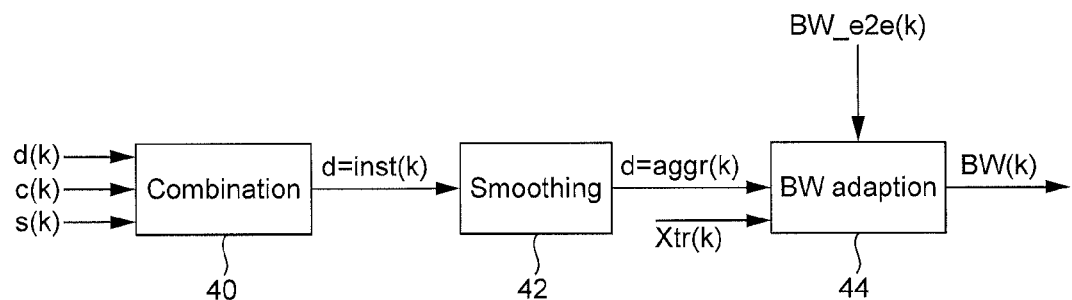
FIG. 4 is a functional block diagram of one form of bandwidth modification.

As for the calculation of d_aggr(k) there are many options. Generally, the values should be smoothed to avoid rapid variation, but still allow for quick reaction to congestion. This can be obtained through adaptive smoothing. FIG. 4 is a schematic block diagram of smoothing of a combined instantaneous value d_inst(k). A combined observation d_inst(k) is generated by a combination function 40, and smoothed by a smoothing function 42. The smoothed value d_aggr(k) is updated quickly if it is smaller than the current instantaneous observation d_inst(k), otherwise it is updated slowly. Mathematically, this can be expressed as: if (d_aggr(k)<d_inst(k))

$$d\_aggr(k)=lambdaFast*d\_aggr(k)+(1-lambdaFast)*d\_inst(k)$$

else $$d\_aggr(k)=lambdaSlow*d\_aggr(k)+(1-lambdaSlow)*d\_inst(k)$$

with $0.5<lambda[Slow/Fast]<1$, and lambdaFast<lambaSlow.

The combined observation, d_inst(k) can be generated by combining the instantaneous values of some or all of $d(k)$, $c(k)$ and $s(k)$. Examples are:

Use the average queue delay reported from link layer directly:

$$d\_inst(k)=d(k).$$

Aggregate the congestion indicator by counting consecutive congestion indicators, f. e.g. if (c(k))

$$c\_count(k)=\min(max\_count,count(k-1)+1;$$

else $$c\_count(k)=\max(0,c\_count(k-1)-1);$$

And then $$d\_inst(k)=\max(d(k),d\_c*c\_count(k)),$$

with a reasonable value for d_c being e.g. 150 ms.

The preferred embodiment takes s(k) into account to take a bigger step when signal quality degrades:

$$d\_inst(k))=\max(d(k),snrboost(k)*d\_c*c\_count(k))$$

With snrboost being determined from any recent drop in signal quality: snrboost=max(1, s_avg(k)−s(k)), with s_avg(k) being an average of recent values of s(k).

In some cases, not all of the parameters $d(k)$, $c(k)$ and $s(k)$ are available; in this case, the equations listed above can be used directly if setting the missing parameters to 0. However, to provide a significant improvement, at least one of $d(k)$ or $c(k)$ must be available: these can be termed buffer status indicators, because they relate to traffic congestion at the network layer 18.

A potential problem of the method described above is that another application running in the same environment may not be listening to the feedback, thus not reacting to congestion. Such an application could gradually steal all available bandwidth from applications reacting properly. Therefore, in a preferred embodiment, we take Xtr(k) into account also. One way of doing this is to let alpha(k) in Equation (2) depend on Xtr(k). For example, if $Xtr(k)=tr\_0(k)/tr\_tot(k)$ as suggested above:

$$alpha(k)=alpha0*\max(0,Xtr(k)-Xtr0)/(1-Xtr0).$$

With 0<Xtr0<1, e.g. Xtr0=0.5. This way, the back-off steps taken will be smaller as the application's share of the total traffic reduces.

The bandwidth adaptation function 44 processes the estimate of e2e BW with the local link information to provide the modified estimate of bandwidth for the application to use in setting the data transmission rate.

Figure 5:
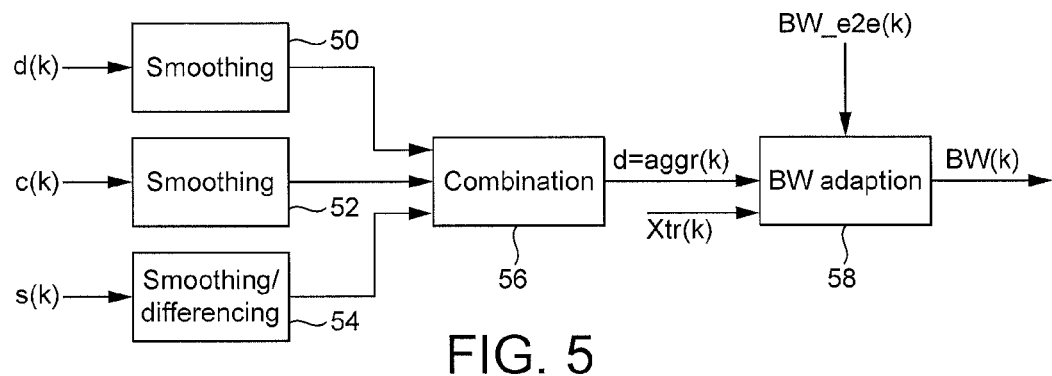
FIG. 5 is a functional block diagram of another form of bandwidth modification.

It will be appreciated that the equations above are only example embodiments, and many variations are possible. Similarly, it is possible to interchange the parameter smoothing and combinations steps as shown in FIG. 5 where individual smoothing functions 50,42,54 are applied to each respective parameter prior to a combination function 56 and BW adaptation function 58.

Figure 6:
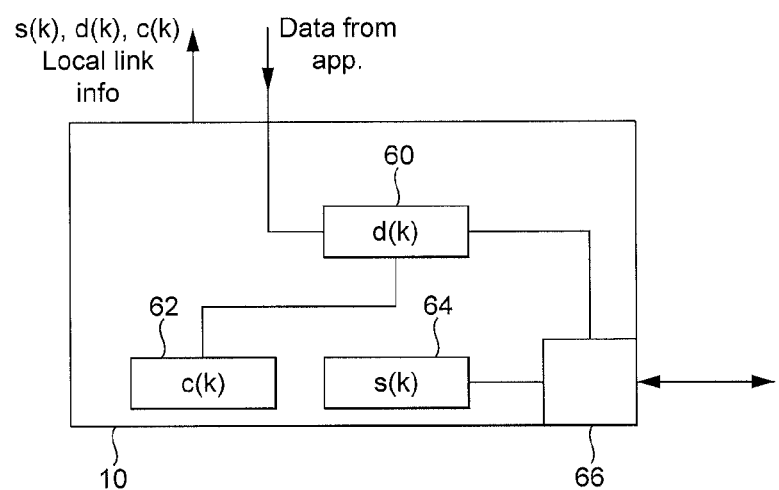
FIG. 6 is a schematic block diagram of wireless access circuit.

FIG. 6 is a schematic block diagram of a radio access chip 10 showing only components relevant for implementing embodiments of the present invention. The chip provides an antenna 66 with associated RF processing circuitry which allows the chip 10 to transmit and receive RF data. As described above, such data can include the feedback and/or estimates of bandwidth when controlling rate using end-to-end bandwidth estimates. In addition, the data can include data from the application layer which is to be transmitted over the communication channel. The chip is also illustrated to include the buffer 60 and monitoring circuitry 64 which monitors wireless conditions on the communication channel, for example, signal-to-noise ratio to provide the parameter s(k). The chip 10 also includes logic for generating the special congestion indicators c(k) based on the buffer status indicator d(k). Connections between the chip 10 and the other layers in the device are shown schematically only by arrows in and out of the chip—it will be evident how such connection can be implemented in practice to receive data from the application to be transmitted, and to supply the communication-related parameters from the chip 10 in the link layer 18 to the application in the application layer 12.

It should be understood that the block and flow diagrams may include more or fewer elements, be arranged differently, or be represented differently. It should be understood that implementation may dictate the block and flow diagrams and the number of block and flow diagrams illustrating the execution of embodiments of the invention. It should be understood that elements of the block and flow diagrams described above may be implemented in software, hardware, or firmware. In addition, the elements of the block and flow diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A wireless device comprising:
   a processor;
   a computer-readable medium;
   an application stored on the computer-readable medium and, when executed on the processor, is configured to perform operations for controlling transmission of data from the wireless device to a receiver connected via a communication channel, the operations comprising:
      providing an estimate of end-to-end bandwidth of the communication channel by at least:
         receiving at the application from wireless access circuitry in the wireless device at least one communication-related parameter; and
         modifying in the application the estimate of end-to-end bandwidth using the at least one communication-related parameter.

2. The wireless device of claim 1, wherein the at least one communication related parameter comprises an indication of a quantity of data in a buffer of the wireless access circuitry.

3. The wireless device of claim 1, wherein the indication comprises at least one of an indication in time or bits.

4. The wireless device of claim 1, wherein the at least one communication-related parameter comprises a congestion indicator parameter.

5. The wireless device of claim 1, wherein the at least one communication-related parameter comprises a wireless signal quality parameter determined by the wireless access circuitry.

6. The wireless device of claim 1, wherein the aggregate is determined according to the following:

$$f(p(k))=\min(\text{beta}*BW\_e2e(k), \text{alpha}(k)*BW\_e2e(k)*(d\_\text{target}-d\_\text{aggr}(k))) \quad (2).$$

7. The wireless device of claim 1, wherein the aggregate is smoothed over time, and wherein the smoothed aggregate is used in modifying the estimate of end-to-end bandwidth.

8. The wireless device of claim 1, further comprising operations of controlling a transmission rate of the data from the wireless device based on the modified estimate of end-to-end bandwidth.

9. The wireless device of claim 1, wherein the aggregate is used in a function comprising a multiplying factor of a difference between a target and a current aggregate, the multiplying factor depending on an indication of data sent by other applications using the communication channel.

10. The wireless device of claim 1, wherein the application is configured to generate the estimate of end-to-end bandwidth at the wireless device.

11. The wireless device of claim 1, wherein the application is configured to receive an estimate of end-to-end bandwidth from a remote device.

12. The wireless device of claim 1, wherein modifying the estimate of the end-to-end bandwidth comprises using an aggregate of a plurality of different communication-related parameters.

13. A method of controlling transmission of data from a wireless device to a receiver connected via a communication channel, the method comprising:
   an application executing on the wireless device providing an estimate of end-to-end bandwidth of the communication channel;
   receiving at the application from wireless access circuitry in the wireless device at least one communication-related parameter;
   modifying in the application the estimate of end-to-end bandwidth using the at least one communication-related parameter.

14. A method according to claim 13, wherein the at least one communication related parameter comprises an indication of a quantity of data in a buffer of the wireless access circuitry.

15. A method according to claim 14, wherein the indication comprises at least one of an indication in time or bits.

16. A method according to claim 13, wherein the at least one communication-related parameter comprises a congestion indicator parameter.

17. A method according to claim 13, wherein the at least one communication-related parameter comprises a wireless signal quality parameter determined by the wireless access circuitry.

18. A method according to claim 13, wherein modifying the estimate of the end-to-end bandwidth comprises using an aggregate of a plurality of different communication-related parameters.

19. A method according to claim 18, wherein the aggregate is determined according to the following:

$$f(p(k)) = \min(beta*BW\_e2e(k), alpha(k)*BW\_e2e(k)*(d\_target - d\_aggr(k))) \quad (2).$$

20. A method according to claim 18, wherein the aggregate is smoothed over time, and wherein the smoothed aggregate is used in modifying the estimate of end-to-end bandwidth.

21. A method according to claim 18, wherein the aggregate is used in a function comprising a multiplying factor of a difference between a target and a current aggregate, the multiplying factor depending on an indication of data sent by other applications using the communication channel.

22. A method according to claim 13 comprising controlling a transmission rate of the data from the wireless device based on the modified estimate of end-to-end bandwidth.

23. A method according to claim 13 wherein the application is configured to generate the estimate of end-to-end bandwidth at the wireless device.

24. A method according to claim 13 wherein the application is configured to receive an estimate of end-to-end bandwidth from a remote device.

* * * * *